Patented Oct. 30, 1928.

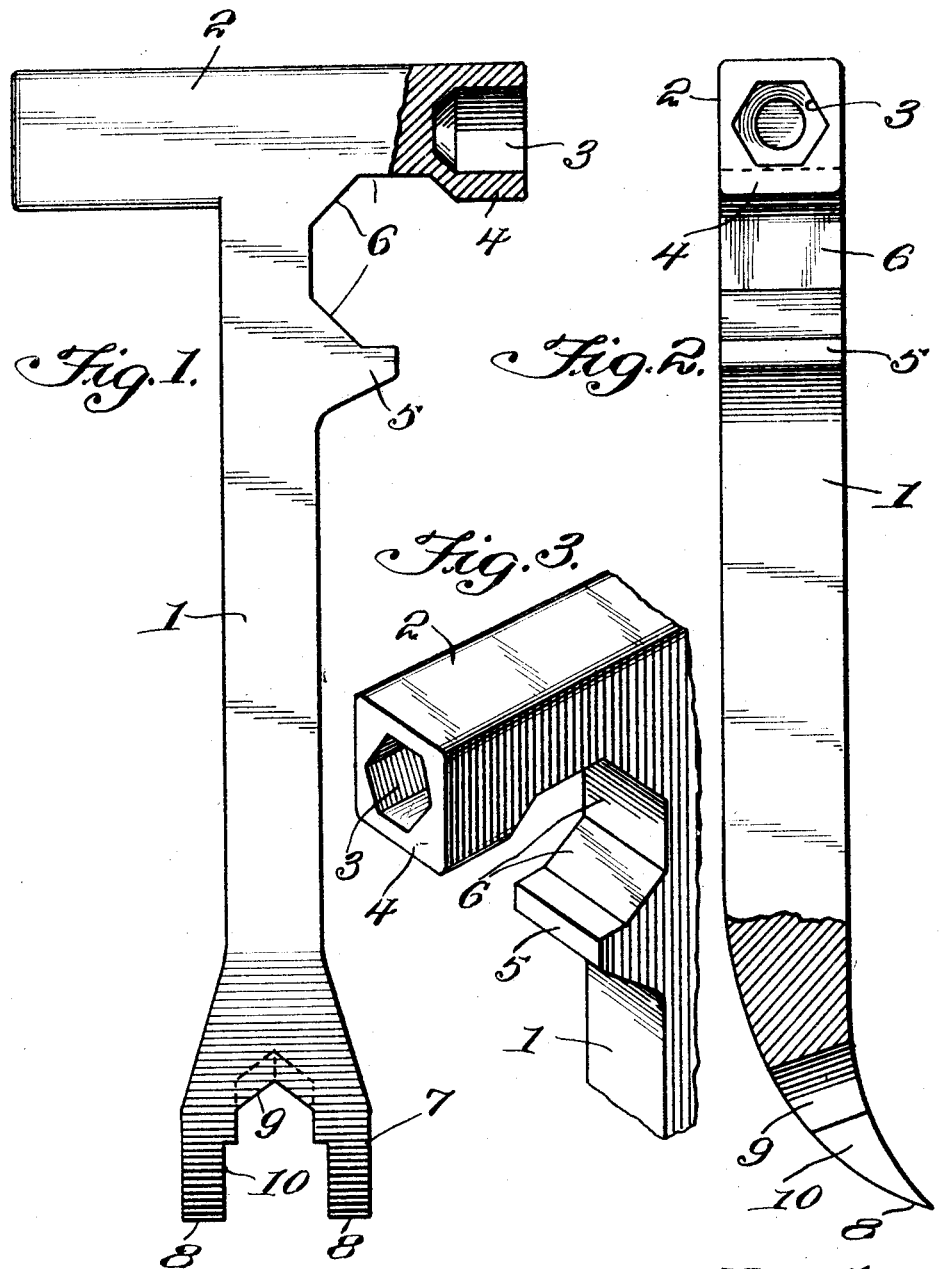

1,689,585

UNITED STATES PATENT OFFICE.

LOUIS F. HASCHART, OF LYNBROOK, NEW YORK.

TIRE TOOL.

Application filed May 9, 1927. Serial No. 190,059.

This invention relates to a combination tool, the general object of the invention being to so form the tool that all the operations of taking off and putting on a spare tire can be carried out with the one tool so that it is not necessary to have a number of tools at hand to put on or take off the tire.

This invention also consists in certain other features of construction and in the combination and arrangement of the several parts to be hereinafter fully described, illustrated in the accompanying drawings, and specifically pointed out in the appended claim.

In describing my invention in detail reference will be had to the accompanying drawings wherein like characters denote like or corresponding parts throughout the several views, and in which:—

Fig. 1 is a side view of the improved tool, with parts broken away,

Fig. 2 is an edge view of the tool, and

Fig. 3 is a perspective view of part of the tool.

In these views, 1 indicates the handle of the tool and 2 indicates the hammer-like head thereof. One end of the head is provided with a socket 3 for receiving a nut so that the nut can be screwed on a lug or bolt or removed therefrom. This part of the head is also provided with a depending part 4 and the handle 1 is provided with a projection 5 which forms with this part 4 a hub-cap wrench, the space between the two parts being formed with a plurality of flat faces 6 so that this space will receive a hub cap, one of these faces being formed by a sloping shoulder formed at the junction of the inner end of the part 4 with the head.

The free end of the handle 1 is of forked shape, as shown at 7, and this end is also of curved shape and tapers to a point, as shown at 8, so that this end can be used as a tire iron. The space between the prongs of the fork has its inner part shaped to provide a valve-lock nut wrench, as shown at 9, and the outer part of this space has its walls spaced to form a spark-plug wrench, as shown at 10.

From the foregoing it will be seen that I have provided a simple tool which can be used for performing a variety of operations. For instance, no other tool will be needed in taking a tire off a wheel or putting it back on the wheel.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A tool of the class described comprising a handle and a hammer-like head, one end of the head having a depending part with the sloping shoulder at the inner end of the depending part, and a projection on the handle forming with said shoulder of said depending part a nut-receiving space, the walls of the space being formed with a plurality of flat faces one of the flat faces being formed by the shoulder.

In testimony whereof I affix my signature.

LOUIS F. HASCHART.